March 12, 1935.  T. H. DEAN  1,994,065
TRACTOR WHEEL
Filed April 24, 1934   2 Sheets-Sheet 1
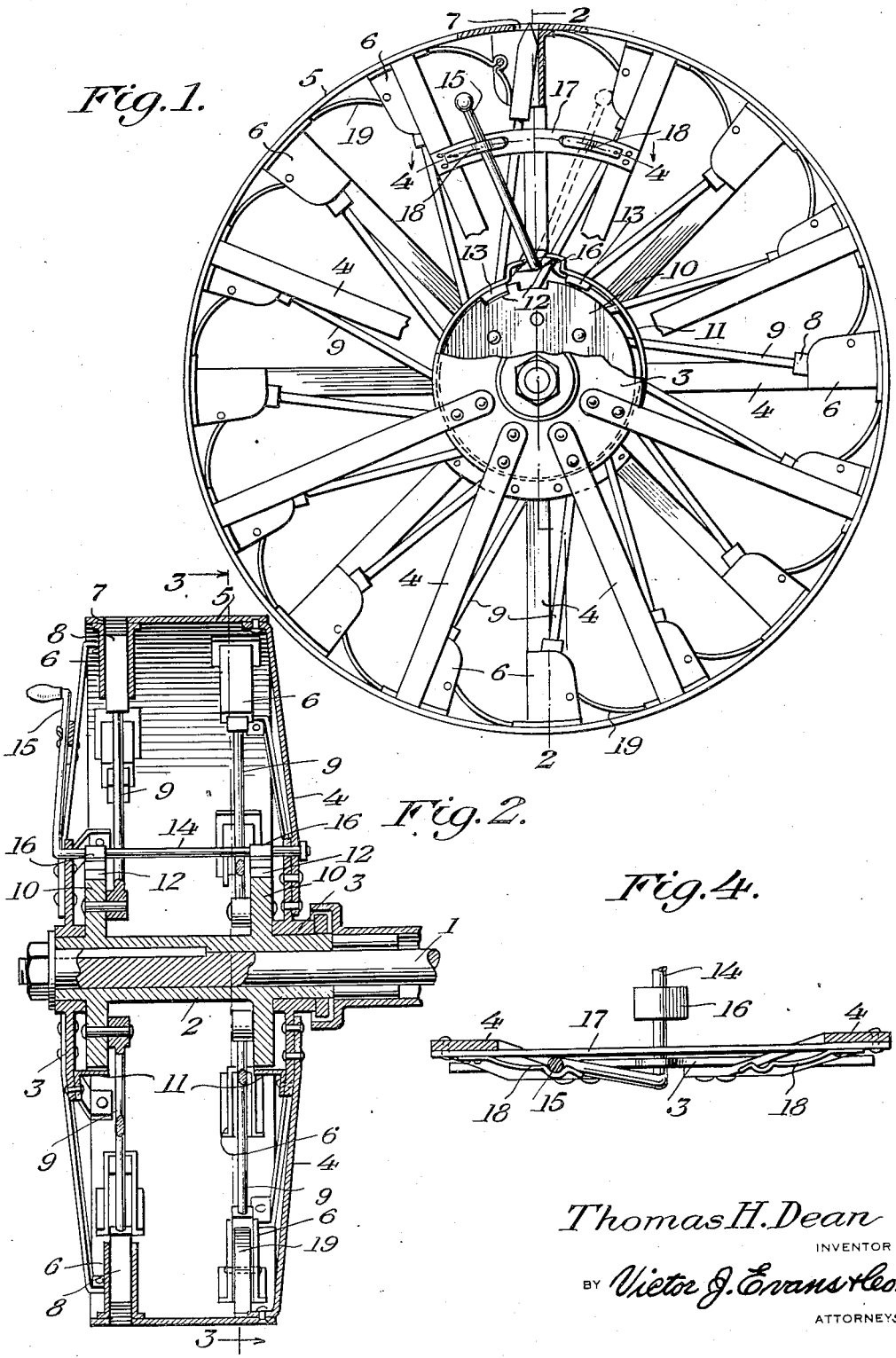
Thomas H. Dean
INVENTOR
BY Victor J. Evans & Co.
ATTORNEYS March 12, 1935.　　T. H. DEAN　　1,994,065
TRACTOR WHEEL
Filed April 24, 1934　　2 Sheets-Sheet 2

Thomas H. Dean
INVENTOR
BY Victor J. Evans & Co.
ATTORNEYS

Patented Mar. 12, 1935

1,994,065

UNITED STATES PATENT OFFICE 1,994,065

TRACTOR WHEEL

Thomas H. Dean, Woodward, Okla.

Application April 24, 1934, Serial No. 722,183

4 Claims. (Cl. 301—46)

This invention relates to a tractor wheel and more particularly to tractor lugs or cleats therefor and has for the primary object the provision of movably mounted lugs or cleats for the wheel and equipped with operating means actuated by the power delivered to the wheel so that the lugs or cleats may be positioned inwardly or outwardly of the tread surface of the wheel when desired without undue manual effort on the part of the operator.

With these and other objects in view, this invention consists in certain novel features of construction, combination and arrangement of parts to be hereinafter more fully described and claimed.

For a complete understanding of my invention, reference is to be had to the following description and accompanying drawings, in which In the drawings:

Figure 1 is a side elevation, partly in section, illustrating a tractor wheel constructed in accordance with this invention.

Figure 2 is a transverse sectional view taken on the line 2—2 of Figure 1.

Figure 4 is a detail sectional view taken on the line 4—4 of Figure 1.

Figure 3:
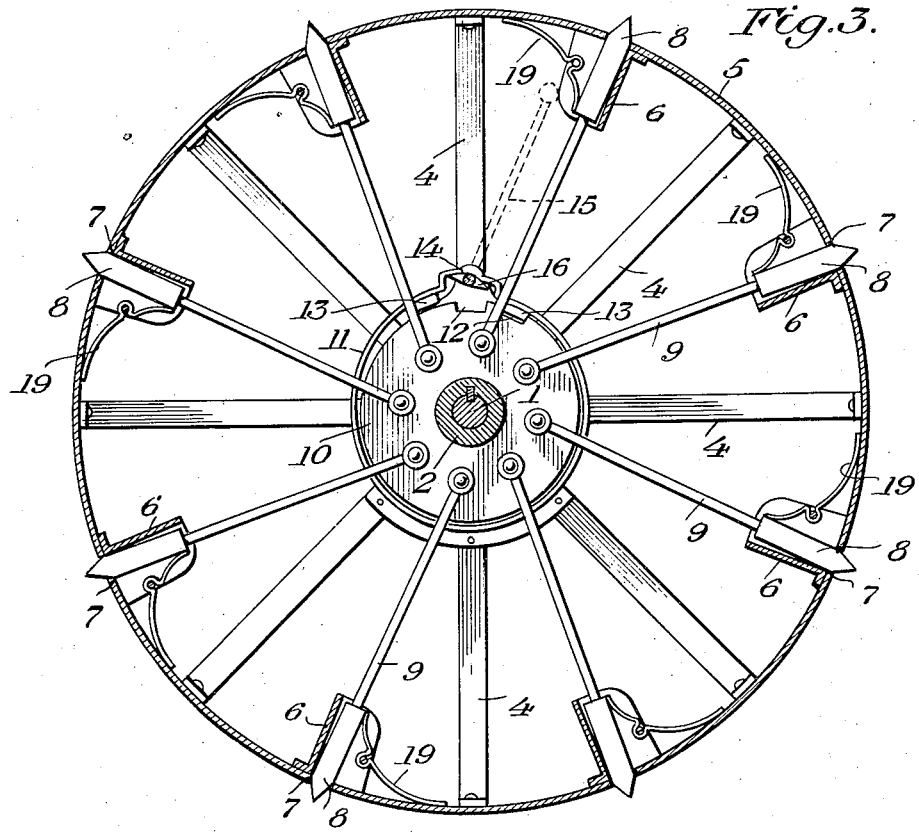
Figure 3 is a sectional view taken on the line 3—3 of Figure 2.
Figure 6:
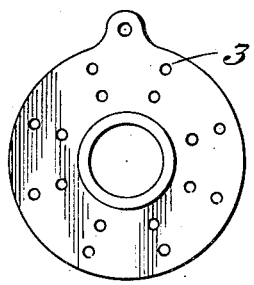
Figure 6 is an end view, illustrating an outer hub member of the wheel.
Figure 5:
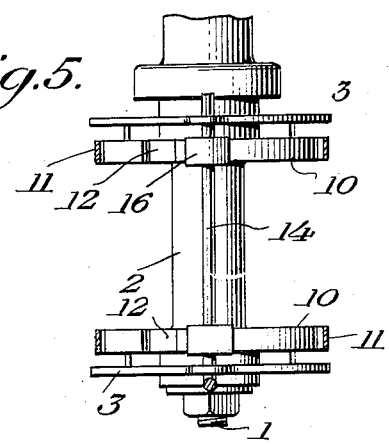
Figure 5 is a fragmentary sectional view illustrating the hub construction of the wheel.

Referring in detail to the drawings, the numeral 1 indicates a power axle of a tractor and has keyed thereto an inner hub member 2 and on which is journaled outer hub members 3 carrying spokes 4 attached to a felly or rim 5. The outer face of the rim is smooth and secured to the inner face of the rim is a plurality of channel shaped brackets 6 communicating with openings 7 in the rim and slidably receiving dogs or cleats 8 formed integrally with rods 9. Spaced discs 10 are formed integrally with the inner hub member 2 and have pivoted thereto the inner ends of the rods 9. Split bands 11 surround the discs 10 and are fixed to the outer hub members 3. The discs 10 are provided with notches 12 and each band 11 carries spaced lugs 13 located adjacent the ends of said band. An operating shaft 14 is journaled to the outer hub members 3 and carries a handle 15 and also pairs of oppositely arranged lugs 16. The lugs of each pair fit under the free ends of the bands so that said ends of the bands may be flexed and with the handle 15 in one position one end of each band is moved outwardly while the other end moves inwardly and vice versa when the handle moves into a second position. A bracket 17 is secured to certain of the spokes 4 and carries spring clips 18. The handle 15 operates from one clip 18 to the other clip 18 for adjusting the ends of the bands.

As shown in Figure 1, one pair of the projections 13 of the bands is disposed in the notches or slots 12 locking the inner hub member to the outer hub members 3 and retaining the lugs or cleats 8 inwardly of the outer face of the rim 5. By reversing the position of the handle 15 from that shown in Figure 1 or, in other words, into engagement with the other clip 18, the ends of the bands will be adjusted so as to disengage the mentioned pair of lugs from the slots and the wheel being turned by the power axle causes the inner hub member 2 to turn free of the outer hub members 3 until the notches receive the other pair of lugs of the band. This movement of the inner hub member causes the lugs or cleats 8 to be moved through the slots 7 of the rim 5, as shown in Figure 3, for the purpose of biting into the roadway to give the wheel desired traction. To retract or position the lugs or cleats 8, as shown in Figure 1, the handle 15 is moved into the position shown in Figure 1 and a rotation of the wheel in a reverse direction by the power axle 1 will cause turning of the inner hub member with respect to the outer hub members to draw the lugs or cleats inwardly.

The lugs or cleats 8 are engaged by tension members 19 to yieldably support said lugs or cleats against their respective brackets.

Having described the invention, I claim:

1. A tractor wheel including outer hub members connected to a rim provided with slots, and a power axle, an inner hub member keyed to the axle and rotatably supporting the outer hub members, cleats slidably supported by the rim and movable inwardly and outwardly of said rim by way of said slots, means connecting the cleats to the inner hub member, and manually controlled drive means between the inner and outer hub members and adapted to permit limited relative movement of said hub members by the power axle for positioning the cleats inwardly or outwardly of the rim.

2. A tractor wheel including outer hub members connected to a rim provided with slots, and a power axle, an inner hub member keyed to the axle and rotatably supporting the outer hub members, cleats slidably supported by the rim and movable inwardly and outwardly of said rim by way of said slots, annular flanges on the inner hub member, rods formed integrally with the cleats and pivotally connected to said flanges, and manually controlled drive means between the flanges and the outer hub members and adapted to permit limited relative movement of the hub members by the power axle for positioning the cleats inwardly and outwardly of the rim.

3. A tractor wheel including outer hub members connected to a rim provided with slots, and a power axle, an inner hub member keyed to the axle and rotatably supporting the outer hub members, cleats slidably supported by the rim and movable inwardly and outwardly of said rim by way of said slots, annular flanges on the inner hub member, rods formed integrally with the cleats and pivotally connected to said flanges, split tension bands secured to the outer hub members and surrounding the flanges, pairs of lugs on said bands and arranged adjacent the ends thereof, said discs having notches to alternatingly receive the lugs of each pair, and a manually controlled means for adjusting the ends of the bands to engage and free the lugs from their respective notches.

4. A tractor wheel including outer hub members connected to a rim provided with slots, and a power axle, an inner hub member keyed to the axle and rotatably supporting the outer hub members, cleats slidably supported by the rim and movable inwardly and outwardly of said rim by way of said slots, annular flanges on the inner hub, rods formed integrally with the cleats and pivotally connected to said flanges, split tension bands secured to the outer hub members and surrounding the flanges, pairs of lugs on said bands and arranged adjacent the ends thereof, said discs having notches to alternatingly receive the lugs of each pair, an operating shaft journaled to the outer hub members, pairs of oppositely disposed lugs on the shaft and engaging the ends of the bands, a handle on the shaft for rotating the latter in opposite directions to cause flexing of the bands to alternatingly engage the lugs thereof with their respective notches, and means for retaining the handle against accidental movement.

THOMAS H. DEAN.